United States Patent [19]

Morrow, Sr. et al.

[11] 4,069,884

[45] Jan. 24, 1978

[54] SELF-PROPELLED DRIVE MECHANISM

[75] Inventors: James G. Morrow, Sr.; David J. Pech; Norman J. Kutz, all of Manitowoc, Wis.

[73] Assignee: The Manitowoc Company, Inc., Manitowoc, Wis.

[21] Appl. No.: 685,689

[22] Filed: May 12, 1976

Related U.S. Application Data

[63] Continuation-in-part of Ser. No. 571,303, April 24, 1975, Pat. No. 4,000,784.

[51] Int. Cl.$^2$ ............................................. B60G 25/00
[52] U.S. Cl. .................................. 180/9.2 R; 180/6.48
[58] Field of Search ................... 180/9.2 R, 9.44, 9.48, 180/6.44, 6.48, 6.54; 212/1

[56] References Cited

U.S. PATENT DOCUMENTS

| | | | |
|---|---|---|---|
| 3,645,349 | 2/1972 | Nichter | 180/6.48 |
| 3,688,858 | 9/1972 | Jespersen | 180/9.2 R |

Primary Examiner—Philip Goodman
Attorney, Agent, or Firm—Leydig, Voit, Osann, Mayer & Holt, Ltd.

[57] ABSTRACT

A self-propelled drive mechanism for a crawler crane or the like including a variable displacement pump and one fixed and one variable displacement motor for each crawler assembly. The displacement of the variable displacement motor may be regulated to alter the combined driving torque and speed imparted by the motors to the crawler assemblies and includes automatic self-balancing feedback means for maintaining the hydraulic pressure within predetermined limits.

5 Claims, 4 Drawing Figures

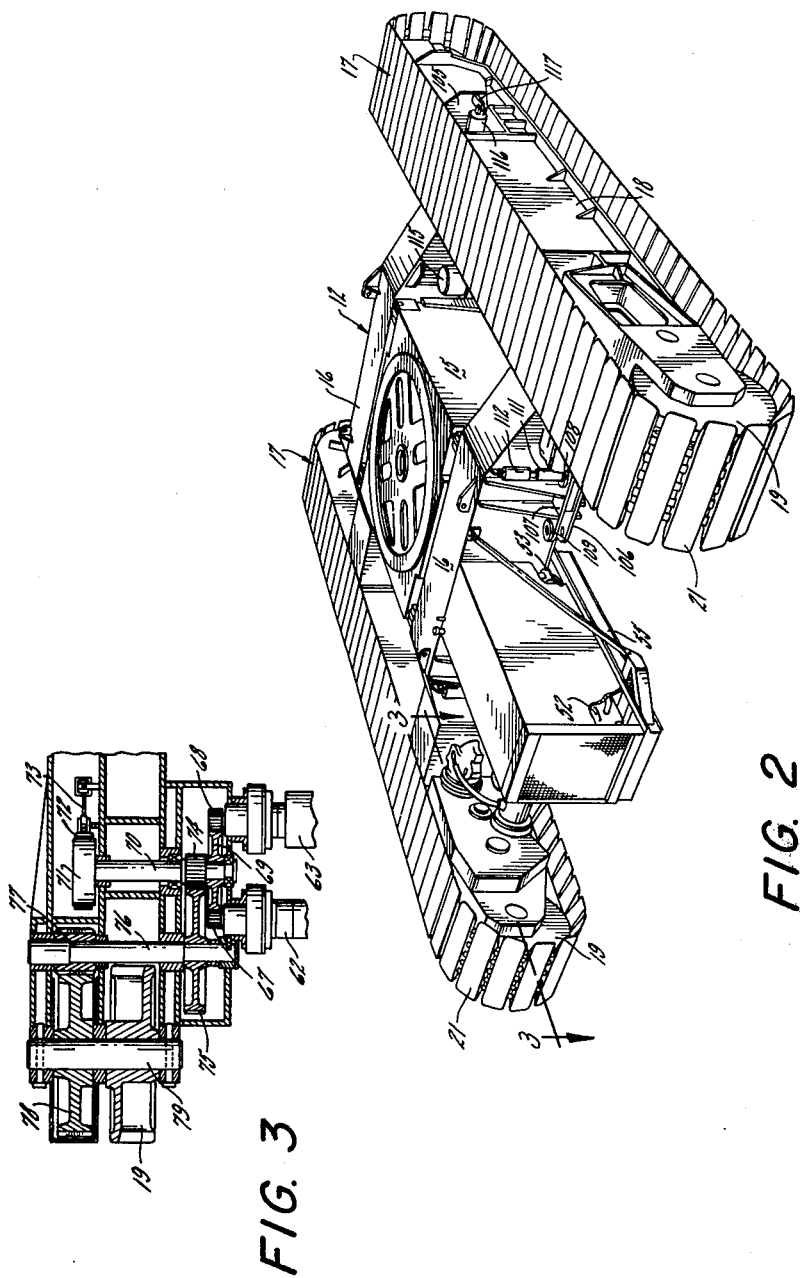

SELF-PROPELLED DRIVE MECHANISM

BACKGROUND OF THE INVENTION

This is a continuation-in-part of application Ser. No. 571,303, filed Apr. 24, 1975, now U.S. Pat. No. 4,000,784.

The present invention relates generally to load handling devices and more particularly concerns a self-propelled transport assembly for such devices.

One of the difficulties with very large load handling devices, such as mobile cranes, is that due to their size they must be disassembled for shipment and transport from one job site to another.

Accordingly it is an object of the present invention to provide a self-propelled transport assembly that may be used separately as a heavy duty transport vehicle when the rotatable upper structure of the load handling device is removed.

It is a more specific object to provide an improved self-propelled drive assembly including both fixed and variable displacement hydraulic motors wherein the driving speed and torque imparted to each crawler assembly may be selectively regulated to meet varying working conditions and including feedback means for maintaining the hydraulic pressure below a predetermined level.

Other objects and advantages of the invention will become apparent upon reading the following detailed description and upon reference to the drawings, in which:

FIG. 2 is a perspective view of the crane lower works or transport assembly with the rotating upper structure, the ring gear and pivot post removed;

FIG. 3 is an enlarged fragmentary section taken along line 3—3 in FIG. 2; and,

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
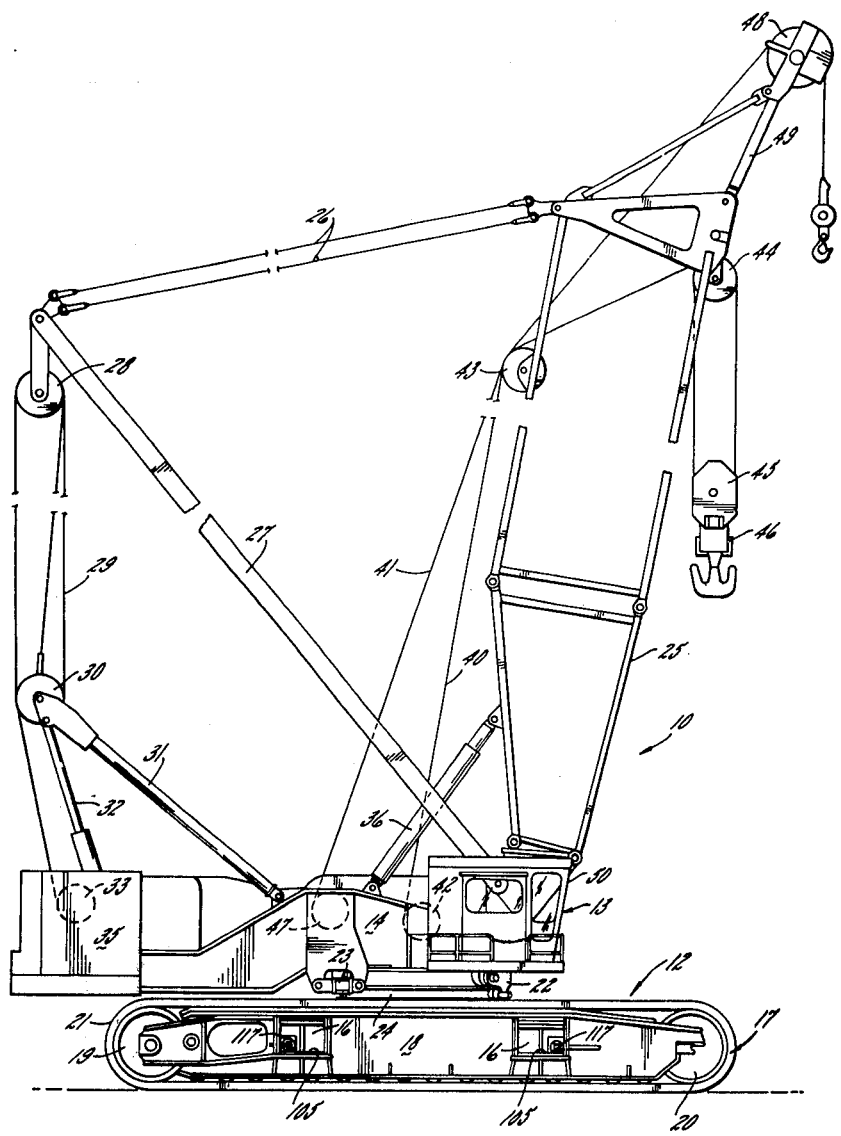
FIG. 1 is a fragmentary side elevation, somewhat schematic, of a crane embodying the invention.

Turning now to the drawings, there is shown in FIG. 1 a load handling device in the form of a crane assembly 10 with which the present invention is associated. The crane assembly 10 includes lower works 12 and upper works 13. As shown more clearly in FIG. 2, the lower works 12 includes a central car body 15 mounted between a pair of transverse beams 16, the ends of which are supported by a pair of traction assemblies 17. Each traction assembly includes side frames 18 which support a drive sprocket 19 and an idler sprocket 20 around which a crawler tread 21 runs.

The upper works 13 of the crane assembly 10 includes a rotatable bed 14 supported by front and rear roller assemblies 22 and 23 which engage a ring gear and roller path 24 on the lower works 12. The upper works 13 carries a pivotally mounted boom 25 supported by two pairs of laterally spaced pendants 26 (only one pair of which is shown) extending rearwardly to the upper ends of laterally spaced masts 27 each of which carries an equalizer assembly 28 around which a boom hoist line 29 runs. Another equalizer assembly 30 is carried by the upper end of a pair of pivotally mounted gantry members 31 which are raised and held in position by a back hitch assembly in the form of a pair of hydraulic cylinders 32 (only one being shown). It will be seen that each of the boom hoist lines 29 forms a multi-part line between the equalizer assemblies 28, 30 and the other end of each line is wound on one drum 33 of a dual drum boom hoist 34 at the rear end of the upper works 13.

To prevent overcentering of the boom 25 when it is raised, the upper works 13 carries automatic, cushioned boom stops 36. Both the boom 25 and the boom stops 36 may be removed from the upper works 13 when it is desired to move the crane 10 to another job site. In the illustrated embodiment the crane 10 is equipped with two lift lines 40 and 41. The front lift line 40 is wound on a drum 42 and extends over a sheave 43 on the rear side of the boom 25 and then makes a double reach between upper and lower equalizer assemblies 44, 45, respectively, carried by the boom and a main hook assembly 46. The rear lift line 41 is wound on another drum 47 and extends over another sheave 43 and then over an upper pulley assembly 48 mounted on the end of a boom extension 49. It will be also understood that the upper works carries a suitable power source, such as a diesel engine (not shown) and appropriate variable control power transmission means for the major functions of the machine. The crane 10 is also provided with an operator's cab 50 within which the controls for the crane functions are located.

Pursuant to the present invention, the lower works 12 is assembled in the form of a self-propelled transport assembly which may be used as an independent load bearing vehicle when the upper works 13 and roller path 24 are removed, as shown in FIG. 2. For driving the lower works 12, an engine 52 powers a pair of variable displacement, hydraulic pumps 53 through an enclosed gear train and transmission case 54 mounted on an engine bed 55 detachably secured to one of the cross beams 16.

Figure 4:
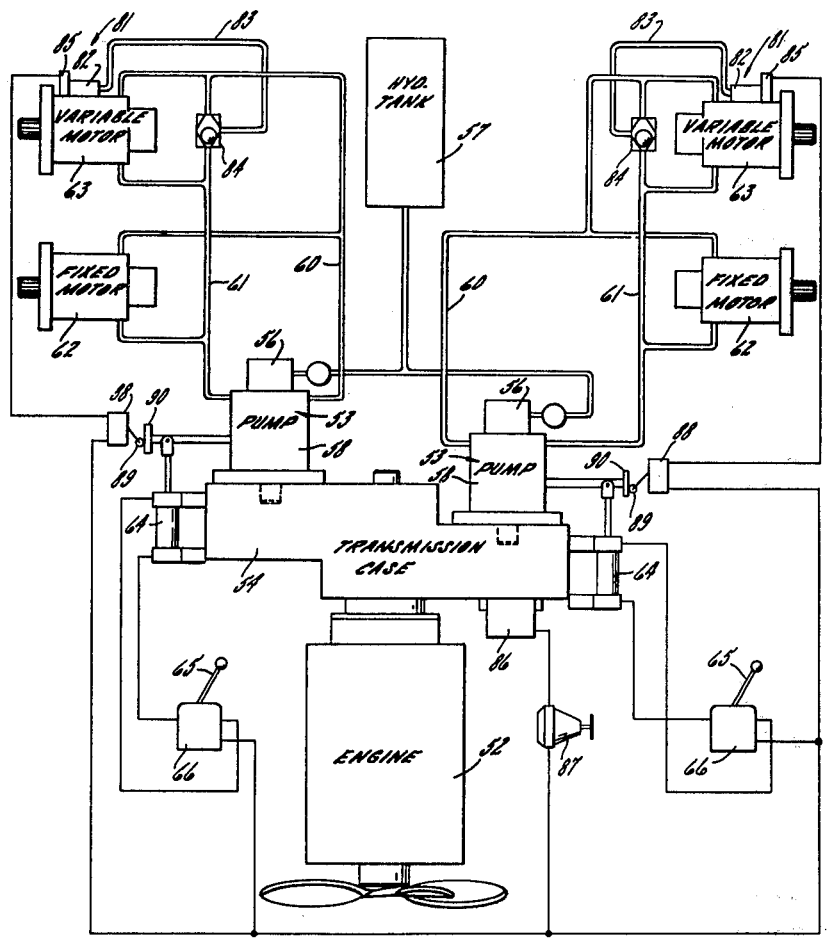
FIG. 4 is a schematic diagram of the hydraulic drive system.

As shown in FIG. 4, the pumps 53 each have a low pressure supply section 56 which draws hydraulic fluid as needed from a reservoir 57 and a variable displacement discharge section 58 coupled by detachable conduits 60 and 61 in closed parallel circuit with a pair of hydraulic motors 62 and 63 mounted on each of the traction assemblies 17. Each pump 53 is also provided with a double acting pneumatic control actuator 64 whereby the pump displacement and supply/discharge direction through the conduits 60, 61 may be selectively regulated. By manipulation of operator levers 65 coupled to valves 66, the actuators 64 are selectively controlled causing the pumps 53 to supply hydraulic fluid in alternate forward and reverse directions to the hydraulic motors 62 and 63 mounted adjacent the rear end of each of the side frames 18.

Referring to FIG. 3, it will be seen that the motors 62, 63 are mounted with their drive gears 67, 68 on opposite sides of and in mesh with a gear 69 on a shaft 70, the opposite end of which carries an inboard brake drum 71 engageable by a brake band 72 upon actuation of a lever 73. The shaft 70 carries another gear 74 in mesh with a gear 75 on an intermediate shaft 76 which in turn carries a gear 77 in mesh with the final drive gear 78 keyed directly to the drive sprocket 19 which is rotatable on a shaft 79. Because they are in mesh with gear 69, both drive gears 67, 68 rotate in the same direction, for example, clockwise when the pumps 53 are operated to drive the motors 62, 63 and tracks 21 forward, and counterclockwise when the output of the pumps 53 is reversed.

In further keeping with the invention, one of the drive motors 62 is a fixed displacement type and the other motor 63 is a variable displacement type having a regulating means 81 therefore. This combination permits a wide range of control over the combined speed and torque imparted by the motors 62 and 63 to the drive sprocket 19. For example, the motor 63 may be of an adjustable swash plate type having a null position at which the motor displacement is zero and having a range of positive and negative displacement positions which reverse the flow direction through the motor. When the swash plate is in the null position, all of the output of the pump 53 is directed to the fixed displacement motor 62. By moving the swash plate into the range of positive displacement positions, the output of the pump 53 is split between the motors 62, 63 reducing the driving speed and increasing the torque imparted to the sprocket 19. Conversely, when the swash plate is moved into the range of negative displacement positions, the motor 63 is effectively transformed into a booster pump drawing fluid from the discharge side of the fixed displacement motor 62 and increasing the pressure of the hydraulic fluid for re-admission into the input side of the motor 62. This, of course, progressively increases the speed of motor 62, but decreases the torque imparted to the sprocket because the variable displacement motor 63 is now being driven by the fixed displacement motor 62 through the gear 69.

In accordance with another aspect of the invention the regulating means 81 includes a spring biased compensating actuator having a feedback section 82 connected to the motor supply/discharge lines 60, 61 by a line 83 and a shuttle valve 84. Pressure from the higher pressure one of lines 60, 61 is thus delivered to the feedback section 82 of the regulating means 81. The compensating actuator of the regulating means 81 also includes a pneumatic pressure section 85 opposing the spring bias and the pressure in the hydraulic feedback section 82. The compensating actuator is preferably of the differential pressure type wherein one psi of air pressure in section 85 balances forty psi of hydraulic pressure in section 82, for example.

Pursuant to the invention, the regulating means 81 maintains the variable displacement motor 63 in full positive displacement until the control levers 63 are moved to place the pumps 53 in substantially full output in either the forward or reverse directions. The pneumatic section 85 of the regulating actuator 81 is energized by pneumatic pressure from a source such as an engine driven pump 86. The pressure output of the pump 86 is regulated by an adjustable regulator 87, which may be set for example at 80 psi. Between the adjustable regulator 87 and the pneumatic section 85 of the compensating actuator 81 is a normally closed poppet valve 88 having an operator 89 biased against a T-shaped lever 90 connected to the actuator 64 for controlling the pump 53.

When the lever 90 is moved by an actuator 64 to place the pump 53 in substantially full output in either the forward or reverse direction, the operator 89 is released and the poppet valve 88 is opened sending air under pressure from the regulator 87 to the pressure section 85 of the actuator 81. This pressure opposes the spring bias and the feedback pressure in section 82 and urges the variable displacement pump 63 toward negative displacement. If the feedback pressure is low, for example below 3000 psi, the variable displacement pump goes to full negative displacement, in effect becoming a pump supplying additional hydraulic fluid to the fixed displacement motor 62 and thus increasing the driving speed. When the feedback pressure increases, for example above 3000 psi, such as when the driving torque demand increases, the hydraulic pressure in the feedback section 82 and the initial spring bias operate against the pneumatic pressure in the pressure section 85 to shift the compensating actuator progressively away from the full negative displacement position. This automatically increases the combined torque supplied by the motors 62, 63 and decreases the feedback pressure until a balanced condition is reached within the range of about 3000-3300 psi feedback pressure, for example.

From the foregoing, it will be appreciated that the drive mechanism of the present invention provides a very versatile drive with a wide range of torque and speed output to meet various operating conditions and requirements.

We claim as our invention:

1. A self-propelled drive mechanism for a load handling vehicle having a central body portion, a pair of side frames and a crawler assembly mounted on each of the side frames, comprising in combination, hydraulic drive means for each crawler assembly including a drive sprocket around which a crawler track is trained, hydraulic pump means mounted on said body portion and detachably connected to said respective drive means for supplying hydraulic fluid thereto, said drive means each including two hydraulic motors coupled to said drive sprocket, one of said motors being a fixed displacement type, the other being a variable displacement type and both being connected in parallel to said pump means, control means for selectively reversing the flow of hydraulic fluid supplied by said pump means to said respective drive means to independently drive said tracks in forward and reverse directions as desired, and means for regulating the displacement of said variable displacement motor to effectively alter the combined driving torque and speed imparted by said motors to said sprocket.

2. The drive mechanism defined in claim 1 wherein said regulating means includes a compensating actuator for maintaining said variable displacement motor in full positive displacement until said control means is operated to place said pump means in substantially full output in either said forward or reverse direction.

3. The drive mechanism defined in claim 2 wherein said actuator includes a hydraulic feedback section coupled to the supply/discharge lines of said variable displacement motor.

4. The drive mechanism defined in claim 3 wherein said actuator includes a pressure section opposing said feedback section, said pressure section being energized for urging said variable displacement pump toward negative displacement when said control means is moved to substantially full output position in either said forward or reverse direction.

5. The drive mechanism defined in claim 4 wherein said actuator is energized by pneumatic pressure from a source controlled by said control means and said source includes a pressure regulator for adjusting the pneumatic pressure admitted to said pressure section in opposition to the feedback pressure in said feedback section up to a predetermined level.

* * * * *